(12) United States Patent
Lynch et al.

(10) Patent No.: US 8,806,472 B2
(45) Date of Patent: Aug. 12, 2014

(54) IN-SERVICE SOFTWARE UPGRADE UTILIZING METADATA-DRIVEN STATE TRANSLATION

(75) Inventors: Timothy John Lynch, San Francisco, CA (US); Scott Ripley Mordock, Sunnyvale, CA (US); Christian Stabel Daudt, Vancouver (CA)

(73) Assignee: Ericsson AB, Stockholm (SE)

( * ) Notice: Subject to any disclaimer, the term of this patent is extended or adjusted under 35 U.S.C. 154(b) by 987 days.

(21) Appl. No.: 12/009,563

(22) Filed: Jan. 18, 2008

(65) Prior Publication Data

US 2009/0089774 A1  Apr. 2, 2009

Related U.S. Application Data

(60) Provisional application No. 60/995,882, filed on Sep. 27, 2007.

(51) Int. Cl.
*G06F 9/44* (2006.01)
*G06F 9/445* (2006.01)

(52) U.S. Cl.
CPC ... *G06F 8/67* (2013.01); *G06F 8/61* (2013.01); *G06F 8/65* (2013.01); *G06F 8/60* (2013.01)
USPC ............ 717/173; 717/168; 717/172; 717/176

(58) Field of Classification Search
USPC ......................................................... 717/168
See application file for complete search history.

(56) References Cited

U.S. PATENT DOCUMENTS

| | | | | |
|---|---|---|---|---|
| 6,069,895 A * | 5/2000 | Ayandeh | .................. | 370/399 |
| 6,836,885 B1 * | 12/2004 | Buswell et al. | ............... | 717/172 |
| 6,910,148 B1 * | 6/2005 | Ho et al. | .................. | 714/4.4 |
| 7,174,547 B2 * | 2/2007 | Wang et al. | .................. | 717/172 |
| 7,194,728 B1 * | 3/2007 | Sirota et al. | .................. | 717/106 |
| 7,430,735 B1 * | 9/2008 | Balakrishnan et al. | ....... | 717/173 |
| 7,516,441 B2 * | 4/2009 | Hamilton et al. | ............. | 717/110 |
| 7,739,677 B1 * | 6/2010 | Kekre et al. | .................. | 717/168 |
| 7,865,888 B1 * | 1/2011 | Qureshi et al. | ................ | 717/168 |
| 8,074,213 B1 * | 12/2011 | Holtz | ............................ | 717/172 |

(Continued)

FOREIGN PATENT DOCUMENTS

| | | |
|---|---|---|
| CN | 1556474 | 12/2004 |
| EP | 1182847 A1 | 2/2002 |
| EP | 1335615 A1 | 8/2003 |
| JP | 2003247400 | 9/2003 |

OTHER PUBLICATIONS

Maurice Herlihy, Software Transactional Memory for Dynamic-Sized Data Structures, 2003, pp. 92-96.*

(Continued)

*Primary Examiner* — Thuy Dao
*Assistant Examiner* — Mongbao Nguyen
(74) *Attorney, Agent, or Firm* — Blakely, Sokoloff, Taylor & Zafman LLP (57) ABSTRACT

A method and apparatus for a metadata-driven upgrade of a network element is described. A network element comprises an active and backup controller card and receives new software to be installed on that network element. In addition, the network element installs the software on the backup controller card and synchronizes the active state of the network element to the backup controller card. Furthermore, the network element uses metadata to translate the active state to the format used by the new software.

25 Claims, 7 Drawing Sheets

(56) References Cited

U.S. PATENT DOCUMENTS

| | | | |
|---|---|---|---|
| 2002/0124245 A1* | 9/2002 | Maddux et al. | 717/176 |
| 2002/0147974 A1* | 10/2002 | Wookey | 717/176 |
| 2003/0005426 A1* | 1/2003 | Scholtens et al. | 717/169 |
| 2003/0088868 A1* | 5/2003 | Chang et al. | 717/173 |
| 2003/0120822 A1* | 6/2003 | Langrind et al. | 709/251 |
| 2003/0126195 A1* | 7/2003 | Reynolds et al. | 709/203 |
| 2003/0233648 A1* | 12/2003 | Earl et al. | 717/176 |
| 2004/0031030 A1* | 2/2004 | Kidder et al. | 717/172 |
| 2004/0034871 A1* | 2/2004 | Lu et al. | 725/111 |
| 2004/0098715 A1* | 5/2004 | Aghera et al. | 717/173 |
| 2004/0264481 A1* | 12/2004 | Darling et al. | 370/401 |
| 2005/0144616 A1* | 6/2005 | Hammond et al. | 717/173 |
| 2005/0198247 A1* | 9/2005 | Perry et al. | 709/223 |
| 2006/0112300 A1* | 5/2006 | Noya et al. | 714/6 |
| 2006/0215547 A1* | 9/2006 | Koppol | 370/220 |
| 2007/0083625 A1* | 4/2007 | Chamdani et al. | 709/223 |
| 2007/0169093 A1* | 7/2007 | Logan et al. | 717/168 |
| 2007/0294686 A1* | 12/2007 | Oh | 717/168 |
| 2008/0115152 A1* | 5/2008 | Welingkar et al. | 719/322 |
| 2009/0183145 A1* | 7/2009 | Hu et al. | 717/168 |

OTHER PUBLICATIONS

Brian Demsky, Automatic Detection and Repair of Errors in Data Structures, 2003, pp. 1-6.*

Michael Hicks, Dynamic Software Updating, 2001, pp. 88-106.*

Extended European Search Report, Application No. 08251127.0, dated Oct. 21, 2009.

Office Action, Chinese Application No. 200810087784.0, dated Feb. 21, 2012, 18 pages Japanese application No. JP-11-191069 A, Publication Date Jul. 13, 1999. Fujitsu Limited and the English translated Abstract.

Notification on Grant of Patent Right for Invention, Chinese Patent Application No. 200810087784.0 dated Sep. 5, 2012, 6 pages.

Korean Office Action, Patent Application No. 10-2008-0029712, dated Apr. 16, 2014, 10 pages.

\* cited by examiner

IN-SERVICE SOFTWARE UPGRADE UTILIZING METADATA-DRIVEN STATE TRANSLATION

CROSS-REFERENCE TO RELATED APPLICATIONS

This application claims the benefit of U.S. provisional patent application No. 60/995,882, entitled "IN-SERVICE SOFTWARE UPGRADE UTILIZING METADATA-DRIVEN STATE TRANSLATION", filed Sep. 27, 2007.

BACKGROUND

1. Field

Embodiments of the invention relate to the field of computer networking; and more specifically, to upgrading network elements utilizing metadata state translation.

2. Background

A network element in a service provider's network typically handles high volumes of data traffic ("traffic") from users accessing several different services and/or communicating with other users. For example, a network element can handle services for up to tens of thousands of users. An interruption in the operation of the network element can cause a disruption of service to these tens of thousand of users.

Figure 1:
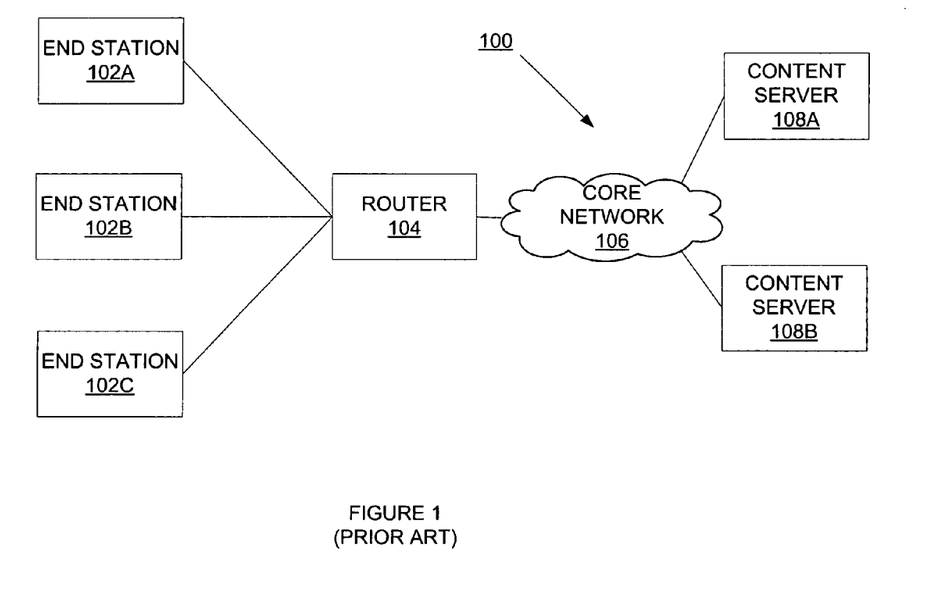
FIG. 1 (Prior Art) illustrates one embodiment of network element handling traffic between end stations content servers through a network.

FIG. 1 illustrates one embodiment of a service provider network 100 with a network element forwarding traffic between end stations and content servers through a network. While in one embodiment, network element is a router, in alternate embodiment, network element can be other networking equipment known in the art (switch, hub, firewall, server, etc.). Furthermore, while in one embodiment network element forwards traffic, in alternate embodiment, network element can perform the same and/or different traffic processing (switch traffic, shape traffic, apply access controls, apply firewall policies, provide file storage or database access, serve web pages, etc.) In FIG. 1, network 100 comprises end stations 102A-C, network element 104, core network 106, and content servers 108A-B. End stations 102A-C couple to network element 104 and network element couples to content servers 108A-B through core network 106. While in one embodiment, end station 102A-C are home personal computers, in alternate embodiments, end stations can be the same or different type of machine (e.g., business computer, personal digital assistant, cell phone, game console, handheld game system, laptop computer, etc.). End stations can couple to network element through any one of the means know in the art (e.g., Ethernet, wireless, digital subscriber line (DSL), cable modem, fiber, etc.). Network element 104 provides an entry point into core network 106 by forwarding traffic from end stations 102A-C to content servers 108A-B, from content servers 108A-B to end stations 102A-C, and traffic going between end stations 102A-C. While in one embodiment, network element 104 is an edge network element that forwards traffic between the edge network servicing end stations 102A-C and core network 106, in alternate embodiments, network element 104 can be a network element or switch positioned differently in the service provider's edge and/or core networks.

Core network 106 is the backbone network of the service provider that typically has high capacity to handle that high volume of traffic traveling through network 100. Content servers 108A-B serve content and/or control information for services offered to end stations 102A-C.

As network element 104 handles the traffic for this large number of users, network element 104 accumulates state information that controls the handling of the traffic. While in one embodiment the state information accumulated by network element 104 is a traffic forwarding table, in alternate embodiments, the state accumulated has the same and/or different information (configuration data, user session information, firewall information, access control lists, quality of service information, statistics, etc.). This state is typically run-time information that does not survive a reboot of network element 104.

Periodically, a network element receives a software upgrade to its services. Typically, a software upgrade requires a reboot of the network element so that software upgrade can take effect. However, a reboot disrupts the service and wipes out the built up state, because the state does not survive a reboot. Even though a reboot of a network element can occur quickly, the rebuilding of the state typically takes longer. Rebuilding of the state involves reconnecting subscribers, rebuilding forwarding tables, subscriber session information, etc.

An improved software upgrade method, termed an "in-service" upgrade, is used when the network element has one or more redundant peers. A peer could be another instance of the same type of network element occupying an equivalent position in the network topology or a redundant component of the network element itself. For example, a network element, such as network element 104, that has two or more controller cards can utilize an in-service upgrade. An in-service upgrade involves first installing and initializing the new software on a backup or standby controller, synchronizing the network element state to the backup controller, switching control to the backup controller and then driving the software upgrade and state restoration to the other network element components. In this algorithm, the backup controller becomes the active controller for the network element and the former active controller is the backup controller.

Figure 2:
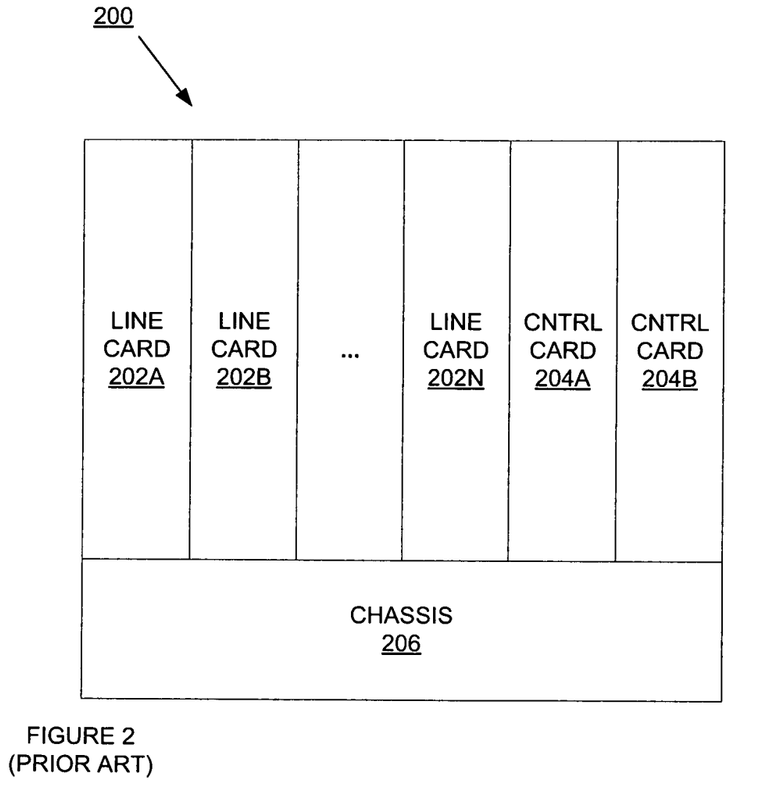
FIG. 2 (Prior Art) is a block diagram of a network element with redundant controller cards.

FIG. 2 is a block diagram of a network element 200 that includes redundant controller cards. In FIG. 2, backplane 206 couples to line cards 202A-N and controller cards 204A-B. While in one embodiment, controller cards 204A-B control the processing of the traffic by line cards 202A-N, in alternate embodiments, controller cards 204A-B perform the same and/or different functions (upgrade software, handle operator requests, collect statistics, etc.) Line cards 202A-N process and forward traffic according to the policies received from controller cards 204A-B. In an alternative embodiment, network element 200 can have one controller card or more than two controller cards.

Figure 3:
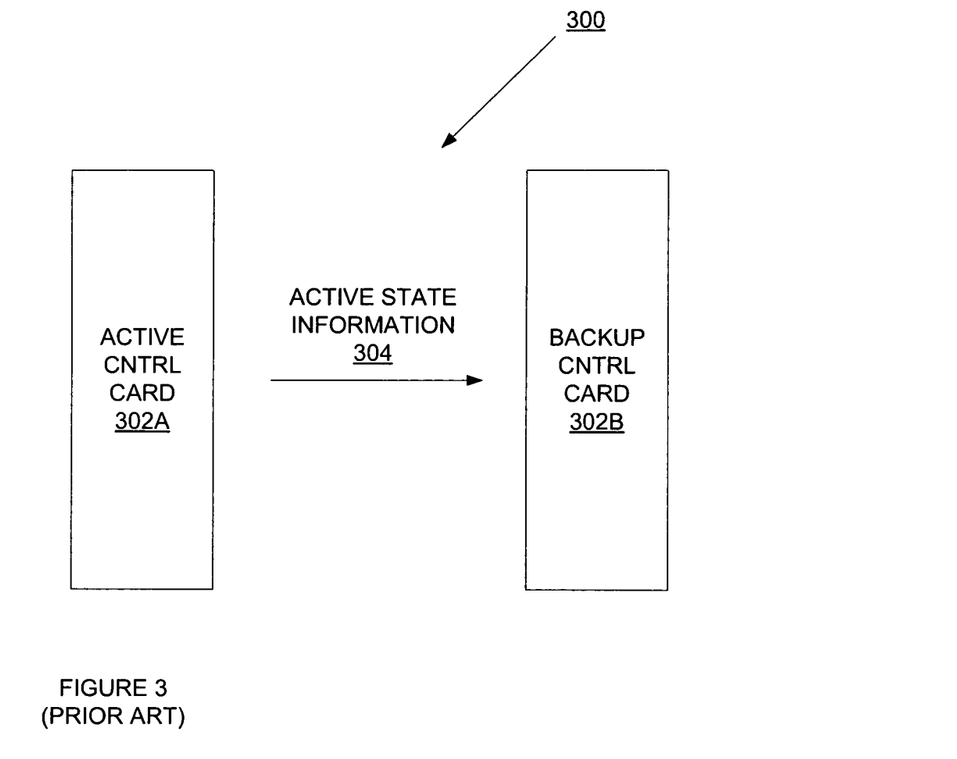
FIG. 3 (Prior Art) is a block diagram of an active controller card passing active state information to a backup controller card.

FIG. 3 is a block diagram of an active controller card passing active state information to a backup controller card. An active controller card is the card that controls the functions of a network element. The backup controller card is the card that is a standby card that could take over control of the network element. For example and by way of illustration, the backup controller card would take over controlling the network element in cases of active controller card failure, upgrade of the network element, etc. While in one embodiment, active state information is the state accumulated by network element 104 as described in reference with FIG. 1, in alternate embodiment, active state information is the same and/or different information used to control network element 104. In FIG. 3, active controller card 302A sends active state information 304 to backup controller card 302B. The in-service upgrade algorithm uses the active state information to perform the upgrade of the network element without a disruption of traffic processing.

A drawback of the in-service upgrade is that the upgrade needs to account for the differences between the old and the new software in the expected format and semantic content of the state. The in-service upgrade algorithm requires that the new software contain explicit knowledge of the precise format and the content of the state data synchronized from the controller running the older software or that the state data be transported in a version-independent format such as tag-length-value. However, the values conveyed by a version-independent format are not defined in any fashion that supports the translation process. There would still need to be knowledge embedded in the software images about the relationship between the version-dependent internal format and the version-independent external format. Using the version-independent format for communication requires the active controller to convert the state data from the native form to an intermediate version-independent format form, send the version-independent format to the backup controller, then convert the version-independent format back to the native form. Encoding such knowledge in the software through writing special-purpose software routines is time-consuming and prone to error.

BRIEF SUMMARY

A method and apparatus for a metadata-driven upgrade of a network element is described. A network element comprises an active and backup controller card and receives new software to be installed on that network element. In addition, the network element installs the software on the backup controller card and synchronizes the active state of the network element to the backup controller card. Furthermore, the network element uses metadata to translate the active state to the format used by the new software.

BRIEF DESCRIPTION OF THE DRAWINGS

Embodiments of the invention may be best understood by referring to the following description and accompanying drawings which illustrate such embodiments. The numbering scheme for the Figures included herein is such that the leading number for a given element in a Figure is associated with the number of the Figure. However, element numbers are the same for those elements that are the same across different Figures. In the drawings.

DETAILED DESCRIPTION

In the following description, numerous specific details such as network element, metadata, metadata format, data definition language, active state information, packet, processor card, line card, controller card, and interrelationships of system components are set forth in order to provide a more thorough understanding of the invention. It will be appreciated, however, by one skilled in the art that the invention may be practiced without such specific details. In other instances, control structures and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the term "coupled," along with its derivatives, is used. "Coupled" may mean that two or more elements are in direct physical or electrical contact. However, "coupled" may also mean that two or more elements are not in direct contact with each other, but yet still co-operate or interact with each other. Exemplary embodiments of the invention will now be described with reference to FIGS. 4-7. In particular, the operations of the flow diagrams in FIGS. 5 and 6 will be described with reference to the exemplary embodiments of FIGS. 4 and 7. However, it should be understood that the operations of these flow diagrams can be performed by embodiments of the invention other than those discussed with reference to FIGS. 4 and 7 and that the embodiments discussed with reference to FIGS. 4 and 7 can perform operations different than those discussed with reference to these flow diagrams.

A method and apparatus for upgrading a network element using metadata is described. According to one embodiment of the invention, the network element uses metadata that describes the fields and structures of the active state maintained by the network element. The active state is information maintained by the network element and derived from communications and interactions with other elements on the network. Furthermore, the active state is information that does not survive a reboot of the network element. The network element translates the current active state using the metadata to a format that supports new software associated with the upgrade.

Figure 4:
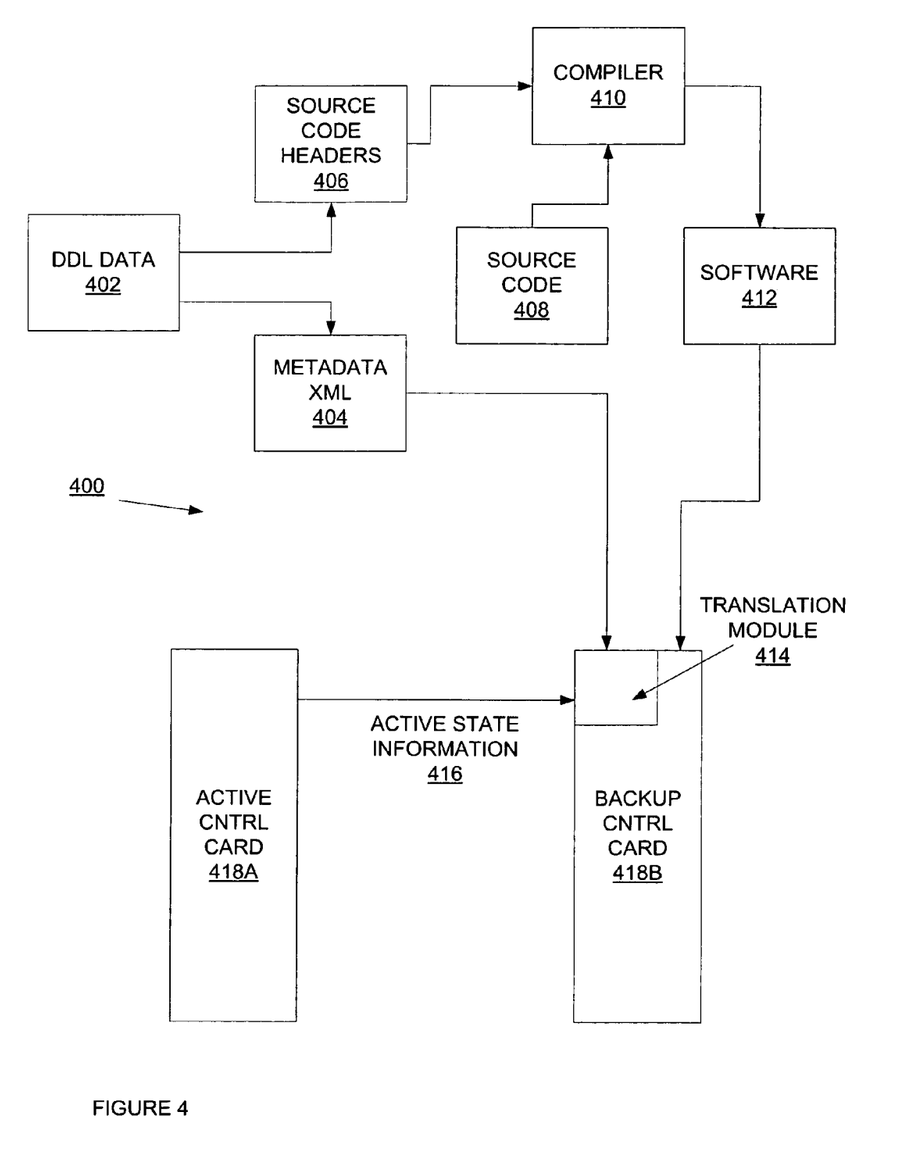
FIG. 4 is a block diagram illustrating metadata creation at the time the software is constructed and the role that metadata serves at the time an individual network element's software is upgraded according to one embodiment of the system.

FIG. 4 is a block diagram illustrating network element software upgrade system according to one embodiment of the system. While in one embodiment, the software is a new or upgraded network element operating system, in alternate embodiments, the software is one or more new and/or upgraded services used by the network element. In FIG. 4, active controller card 418A sends active state information 416 to backup controller card 418B. In one embodiment, active controller card 418A and backup control 418B card run different versions of software. While in one embodiment, the software running on backup controller card 418B is an upgraded version of software running on the active controller card 418A, in alternative embodiments, the software versions running on controller cards 418A-B can be the same and/or different software. As described in FIG. 1, active state information 416 can comprise dynamic state built up during runtime. In one embodiment, active state information is the state built up as described above. Backup controller card 418B comprises translation module 414 that translates active state information 416 from the software running on active controller card 418A to a form for use with the upgraded software running on backup controller card 418B. While in one embodiment, translation module 414 uses metadata 404 for the active state information 416 translation, in alternate embodiments, translation modules used the same and/or different information for the active state translation (e.g. metadata associated with the old software, etc.).

In addition, in FIG. 4, metadata 404 is generated from data definition language (DDL) data 402. While in one embodiment metadata 404 is defined in extensible markup language (XML), in alternative embodiments, metadata 404 is defined in alternative format (plain text, Hypertext Markup Language (HTML), word processing formats known in the art, database formats known in the art, a proprietary format, etc.). Furthermore, in one embodiment, metadata 404 is extensible and version independent. In one embodiment, metadata 404 describes the structure and fields of active state information 416. In this embodiment, metadata 404 describes the constituent fields of each active state information 416 data structure, including the name, type, size, and offset in that data structure. While in one embodiment, metadata 404 supports data types such as strings, integers, real numbers, Booleans, in alternative embodiments, metadata 404 supports the same and/or other data types (enumerations, constants, bitmasks, type definitions, etc.). Furthermore, data structures can be defined in metadata 404 using such data types. In one embodiment, metadata 404 and/or source code headers 406 is generated using a DDL parser known in the art (not shown).

While in one embodiment, the DDL resembles the programming language C's data definitions with additional fields and features for defining information useful for data conversion and translation, in alternate embodiments, the DDL can be another language that supports defining data types and structures (another programming language, XML, plain text, etc.).

In one embodiment, DDL data 402 contains data that describes the structure and fields of active state information 416 in the DDL format. In one embodiment, DDL data is processed into source code headers 406. While in one embodiment source code headers 406 are C language headers, in alternative embodiments, source code headers 406 can be in a different language header (C++, Pascal, etc.). In one embodiment, compiler 410 compiles source code 408 and source code headers 406 into network element operating system 412. While in one embodiment, software 412 is the network element operating system that runs the network element, including the software that controls the traffic forwarding, processing, shaping, etc. functions of the network element, in another embodiment, software 412 is one or more services used by the network element. As described above, software 412 is sent to backup controller card 418B to upgrade the network element.

Figure 5:
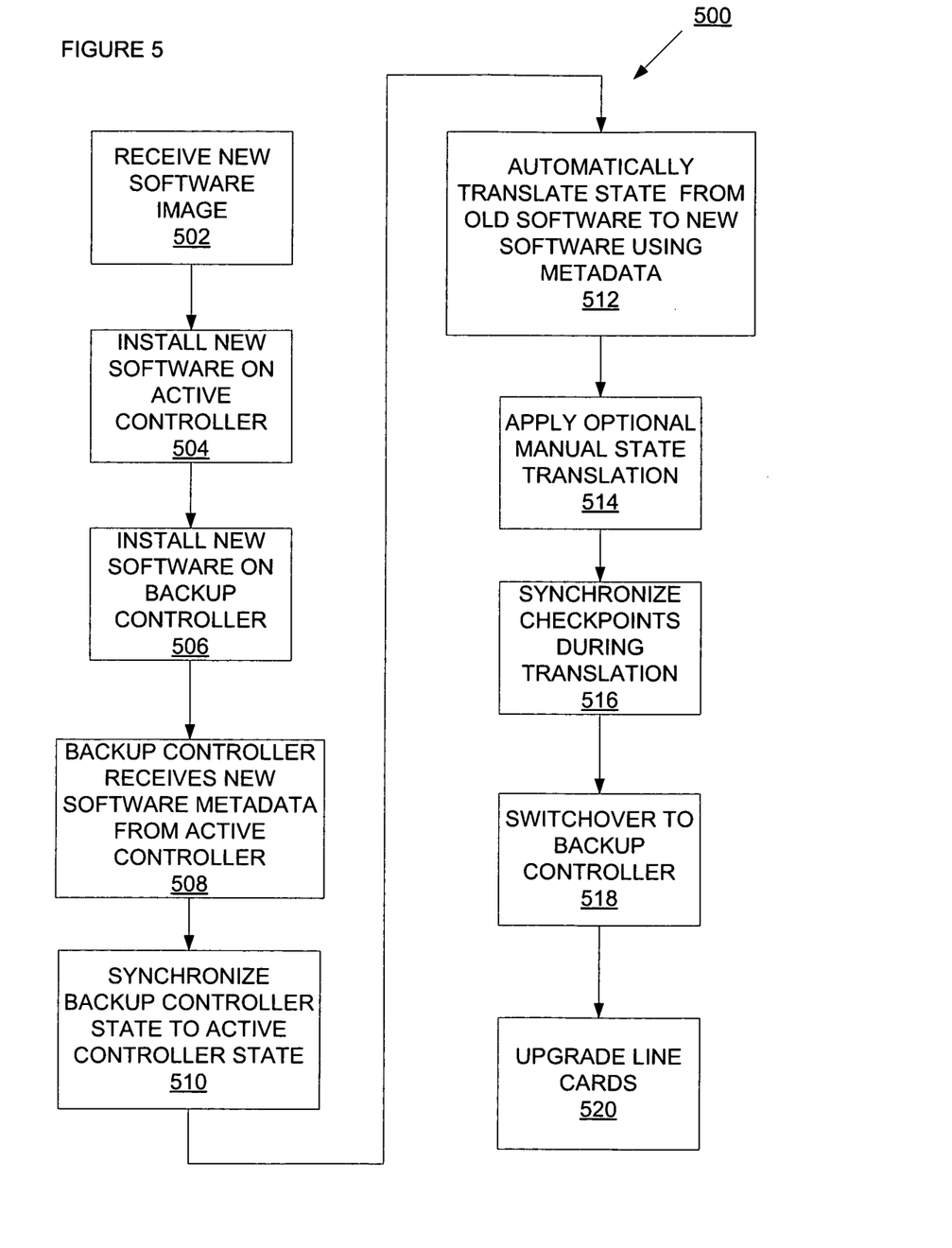
FIG. 5 is an exemplary flow diagram for performing an in-service upgrade using metadata state translation according to one embodiment of the system.

FIG. 5 is an exemplary flow diagram of a method 500 for performing an in-service upgrade using metadata state translation according to one embodiment of the system. In FIG. 5, at block 502, method 500 receives the new software. In one embodiment, the network element receives the new software.

At block 504, method 500 installs the software on the active controller card. In one embodiment, the new software are transferred over a network and written to non-volatile storage medium, such as flash memory or a disk drive. Method 500 installs the software on the backup controller card at block 506. In one embodiment, method 500 reboots the backup controller so the new software is running on the backup controller.

At block 508, method 500 receives the old software metadata from the active controller card. In one embodiment, the received metadata is the structure and fields of active state information 416 associated with the old software and are generated from DDL data 402 as discussed in reference to FIG. 4 above.

At block 510, method 500 synchronizes the backup controller active state information to the active controller active state information. In one embodiment, method 500 sends active state information 416 from the active controller card 418A to backup controller card 418B as described in reference to FIG. 4 above.

At block 512, method 500 automatically translates the active state associated with the old software to the new active state associated with the new software using the metadata. In one embodiment, method 500 compares the metadata associated with the new software to the received metadata associated with the old software to identify the differences between the two sets of metadata. With these differences, method 500 recognizes field changes that are compatible for the automatic translation. Method 500 propagates data elements corresponding to known fields from the current active state to the new active state. For example and by way of illustration, method 500 translates an old active state data structure A containing one unsigned int field to a new active state data structure A containing a sixteen character string field and the same unsigned int field by offsetting the unsigned int field the appropriate number of bytes to store the new character string field. Method 500 handles fields that are in a data structure of the new metadata by adding, removing, or rearranging fields within the data structure using general purpose, metadata-driven translation routines. In addition, method 500 can assign a default value to a field, increase or decrease the size of a field, change a literal definition associated with an enumerated constant, split a field into sub-fields, change the number of elements in a vector, change certain datatypes with other compatible datatypes (such as a signed integer to an unsigned integer), shift the location of bits in bitfields, change the location of a field within a structure, etc. This reduces the amount of specific translation routines, such as the type used in block 514 below.

At block 514, method 500 optionally manually translates parts of the old active state information that were not translated automatically in block 512. In one embodiment, method 500 uses the old metadata as an input to determine and execute any additional steps needed to translate the old data structure to the new data structure.

At block 516, method 500 synchronizes checkpoints of the changing active state during the translation. In one embodiment, method 500 monitors the translation process via a checkpoint mechanism. In this embodiment, each component of method 500 that translates data, reports when the data has been successfully translated. In one embodiment, method 500 waits until each component reports that the data has successfully transferred and translated.

At block 518, method 500 switches control of the network element from the active controller card to the backup controller card. In this embodiment, the backup controller card becomes the active card and the former active controller card is the backup. In this embodiment, method 500 reboots the former active controller card, so that the former active controller card is running the new software. In addition, method 500 synchronizes the state between the new active controller card and the new backup controller card. For example and by way of illustration, method 500 switches over control from controller card 418A to controller card 418B (as described in reference with FIG. 4). Method 500 reboots controller card 418A so that controller card 418A is running the new software. Moreover, method 500 synchronizes the active state in controller card 418B to controller card 418A.

At block 520, method 500 upgrades the software running on other components in the system. In one embodiment, method 500 uses the new software to upgrade the packet processor(s) on each line card. Method 500 resets the packet processors so the packet processors are using the new software associated with the packet processors.

Figure 6:
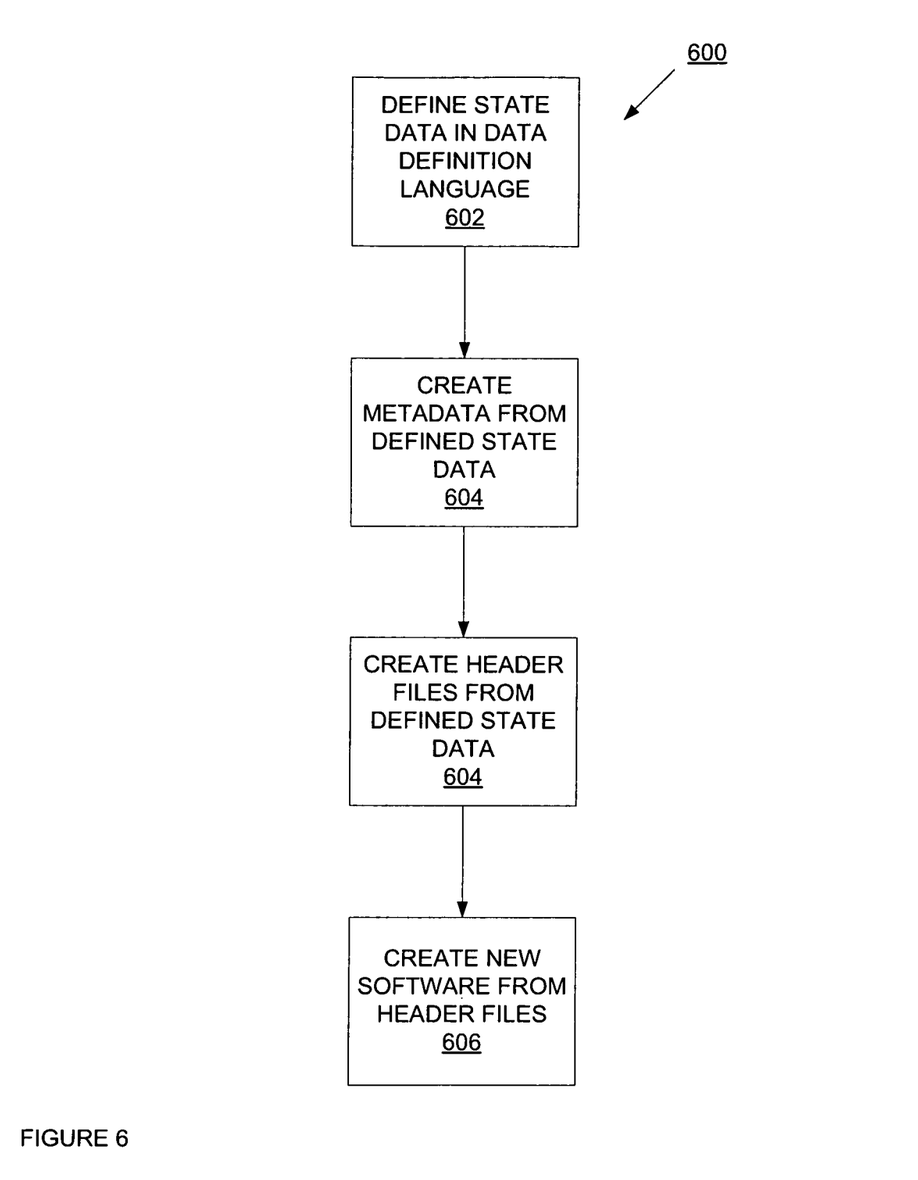
FIG. 6 is an exemplary flow diagram for creating the metadata according to one embodiment of the system.

FIG. 6 is an exemplary flow diagram of a method 600 for creating the metadata according to one embodiment of the system. In FIG. 6, at block 602, method 600 defines the active state data in the DDL. In one embodiment, method 600 defines the format of the active state as discussed in FIG. 4 at block 402 above. At block 604, method 600 creates the metadata from the state data definitions. In one embodiment, method 600 creates metadata by parsing the state data format definitions in the DDL as described further with reference to FIG. 4.

At block 606, method 600 creates the programming language data type definitions for the defined state data format. In one embodiment, method 600 creates the data type definitions as described in FIG. 4. At block 608, method 600 compiles the new software from the data type definitions and the other software source code. In one embodiment, method 600 compiles the new software from the generated data type definitions and other software code as described in reference with FIG. 4.

Figure 7:
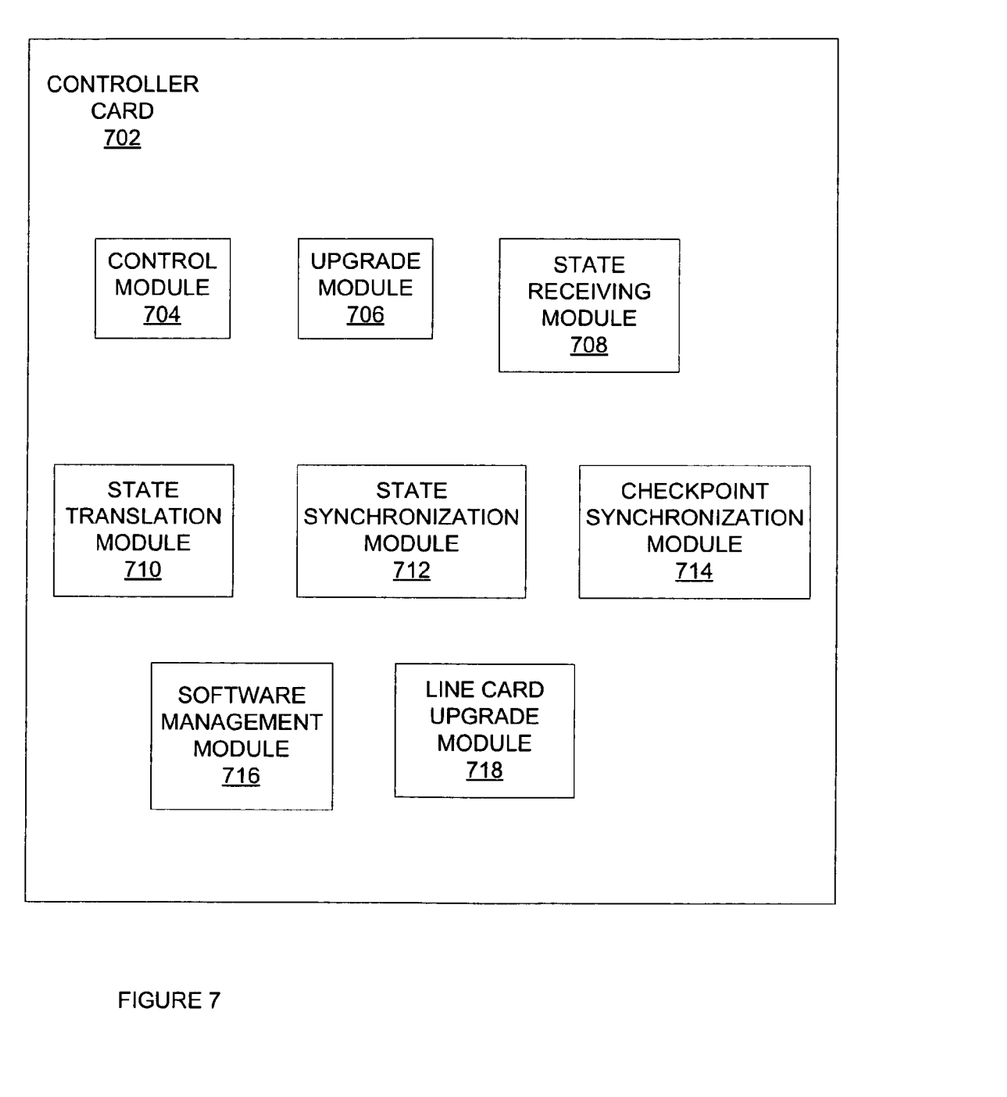
FIG. 7 is a block diagram illustrating a controller card according to one embodiment of the invention.

FIG. 7 is a block diagram illustrating a controller card 702 according to one embodiment of the invention. In FIG. 7, controller card 702 comprises control module 704, upgrade module 706, state receiving module 708, state translating module 710, state synchronization module 712, synchronization checkpoint module 714, software management module 716, and line card upgrade module 718. While in one embodiment, controller card 702 is controller cards 418A-B, in alternate embodiments, controller card is one of controller card 418A-B. Control module 704 performs control of controller card 702 and switches control of the controller cards as described in FIG. 5, block 518. Upgrade module 706 controls the network element software upgrade process of controller card 702. State metadata receiving module 708 receives the old metadata as described in FIG. 5, block 508. State translating module 710 translates the received active state to support the new software as described in FIG. 5, block 512. In one embodiment, state translating module 710 is translation module 420. State synchronization module 712 synchronizes the active information between the active controller card and the backup controller card as described in FIG. 5, block 510. Checkpoint synchronization module 714 maintains and monitors the checkpoints during the active state translation as described in FIG. 5, block 516. Software management module 716 receives and stores the new software and metadata for a controller card as described in FIG. 5, blocks 502, 504 and 506. Line card upgrade module 718 upgrades the line card as described in the FIG. 5, block 520.

This implementation of the metadata driven upgrade is an example, and not by way of limitation. Thus, network elements having other architectural configurations can incorporate embodiments of the invention. Examples of other network elements that could incorporate embodiments of the invention could have multiple controller cards or have a single controller card incorporating the functionality of metadata driven in-service upgrade.

Controller cards 204A-B as well as line cards 202A-N included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (e.g., stores) information in a form readable by a machine (e.g., a computer). For example, a machine-readable medium includes read only memory (ROM); random access memory (RAM); magnetic disk storage media; optical storage media; flash memory devices; etc.
Alternative Embodiments While the invention has been described in reference to an active and backup controller card, in alternate embodiments, two network elements could be used for a metadata driven translation of an active state of an active network element. In this embodiment, the second network element would synchronize the active state, translate the active state using the metadata to support new software and switch control to the second network element. Further in this embodiment, the second network element would be the active network element and the first network element would become the backup for the second network element.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed within a network element, comprising:
    receiving new software to be installed on the network element having an active controller card and a backup controller card, wherein the new software comprises metadata describing a format used by the new software to store and access state information of the network element;
    installing the new software on the backup controller card;
    synchronizing an active state of the network element on the backup controller card, wherein the active state is associated with an old software running on the network element; and
    translating the active state that is synchronized on the backup controller card using the metadata to the format used by the new software, wherein the active state that is translated using the metadata includes at least one of a traffic forwarding table, user session information, and subscriber session information, wherein the active state that is translated has been dynamically built up during runtime and is used to control how the network element handles data traffic, and wherein the metadata that is used to translate the active state describes a structure and fields of an active state data structure to be used by the new software, wherein the translating further comprises performing at least one of:

translating data from fields of an active state data structure used by the old software to fields of the active state data structure used by the new software that have been rearranged relative to the fields of the active state data structure used by the old software; and assigning a default value to a field of the active state data structure used by the new software that is not found in the active state data structure used by the old software.

2. The method of claim 1, wherein the new software is one of a network element operating system and a service running on the network element, wherein the active state that is translated using the metadata includes the traffic forwarding table, and wherein the metadata is defined in an extensible markup language (XML).

3. The method of claim 1, wherein the translating further uses a set of metadata associated with the old software, wherein the set of metadata associated with the old software describes constituent fields of the active state data structure used by the old software including names, types, and sizes of the constituent fields, and wherein translating comprises comparing the metadata describing the format used by the new software with the set of metadata associated with the old software.

4. The method of claim 1, further comprising switching over control from the active controller card to the backup controller card so that the backup controller card becomes a new active controller card, wherein the new active controller card is running the new software, and wherein the metadata describes fields of a data structure used by the new software including names, types, and sizes of the fields.

5. The method of claim 1, further comprising generating the metadata from state data defined in a data definition language.

6. The method of claim 1, wherein the translating also includes one or more of adding a field to the active state data structure, removing a field from the active state data structure, rearranging two or more fields in the active state data structure, and changing a literal value associated with an enumerated constant.

7. The method of claim 1, further comprising comparing the metadata describing the format used by the new software with metadata describing a format used by the old software to store and access the active state.

8. A machine-readable medium that stores instructions, which when executed by a set of one or more processors, cause said set of one or more processors to perform operations comprising:

receive new software to be installed on a network element having an active controller card and a backup controller card, wherein the new software comprises metadata that describes a format used by the new software to store and access state information of the network element;

install the new software on the backup controller card;

synchronize an active state of the network element on the backup controller card, wherein the active state is associated with an old software that runs on the network element; and translate the active state that is synchronized on the backup controller card using the metadata to the format used by the new software, wherein the active state that is translated using the metadata includes at least one of a traffic forwarding table, user session information, and subscriber session information, wherein the active state to be translated is operable to control how the network element handles traffic and has been dynamically built up during runtime and derived from interactions with other network elements in a network, wherein the metadata that is used to translate the active state describes a structure and fields of an active state data structure used by the new software, wherein the translation includes performing at least one of the following operations:

translate data from fields of an active state data structure used by the old software to fields of the active state data structure used by the new software that have been rearranged relative to the fields of the active state data structure used by the old software; and assign a default value to a field of the active state data structure used by the new software that is not found in the active state data structure used by the old software; and wherein the machine-readable medium is selected from a read only memory (ROM), a random access memory (RAM), a magnetic disk storage media, an optical storage media, and a flash memory device.

9. The machine-readable medium of claim 8, wherein the new software is one of a network element operating system and a service running on the network element.

10. The machine-readable medium of claim 8, wherein the instructions which when executed cause the set of processors to translate further cause the set of processors to use a set of metadata associated with the old software, and wherein the instructions further comprise instructions that when executed cause the set of processors to compare the metadata that describes the format used by the new software to the set of metadata associated with the old software.

11. The machine-readable medium of claim 8, wherein the instructions further cause the set of processors to:

run the new software in the backup controller card; and switch over control from the active controller card to the backup controller card.

12. The machine-readable medium of claim 8, wherein the instructions further cause the set of processors to generate the metadata from state data defined in a data definition language.

13. The machine-readable medium of claim 8, wherein the instructions which when executed cause the set of processors to translate further cause the set of processors to translate a field of a state data structure used by the old software to a state data structure used by the new software including offsetting the field by a different number of bytes in the state data structure used by the new software as compared to in the data structure used by the old software.

14. An apparatus comprising:

an active controller card;

at least one of a processor and an Application Specific Integrated Circuit (ASIC) of the active controller card;

a memory;

a software management module to receive new software to be installed on a network element having the active controller card and a backup controller card, wherein the new software comprises metadata that describes a format used by the new software to store and access state information of the network element, and wherein the software management module is configured to install the new software on the backup controller card;

a state synchronization module to synchronize an active state of the network element on the backup controller card, wherein the active state is associated with an old software currently installed to run on the active controller card; and a state translation module to translate the active state that is synchronized on the backup controller card using the metadata to the format used by the new software, wherein the active state to be translated is to include runtime information that has been derived from interactions with other elements in a network and that is used to control how the network element forwards traffic, and wherein the metadata that is to be used to translate the active state is operable to describe an active state data structure to be used by the new software for representing the active state, wherein the state translation module is operative to perform one or more of the following as part of the translation:

translate data from fields of an active state data structure used by the old software to fields of the active state data structure used by the new software that have been rearranged relative to the fields of the active state data structure used by the old software; and assign a default value to a field of the active state data structure used by the new software that is not found in the active state data structure used by the old software.

15. The apparatus of claim 14, wherein the new software is one of a network element operating system and a service running on the network element, and wherein the active state that is to be translated using the metadata includes a traffic forwarding table.

16. The apparatus of claim 14, wherein the state translation module is further configured to compare a set of metadata associated with the old software with the metadata that describes the format used by the new software.

17. The apparatus of claim 14, further comprising a control module to switch over control from the active controller card to the backup controller card so the backup controller card becomes a new active controller card, wherein the new active controller card runs the new software, and wherein the metadata describes fields of a data structure.

18. The apparatus of claim 14, wherein the active state information comprises a traffic forwarding table.

19. The apparatus of claim 14, wherein the metadata is defined in a markup language.

20. The apparatus of claim 19, wherein the metadata is defined in extensible markup language (XML) and wherein the state information includes a traffic forwarding table.

21. A network element comprising:

an active controller card configured to control functions of the network element;

a backup controller card, wherein the network element is configured to, receive new software to be installed on the network element, wherein the new software comprises metadata that describes a format used by the new software to store and access state information of the network element, the state information including run-time traffic forwarding information to control forwarding of traffic, install the new software on the backup controller card, synchronize an active state of the network element on the backup controller card, wherein the active state is associated with an old software running on the network element, and translate the active state that is synchronized on the backup controller card, including the run-time traffic forwarding information that is to control the forwarding of the traffic, using the metadata to the format used by the new software, wherein the metadata used to translate the active state describes a structure and fields of an active state data structure to be used for the active state in a markup language, wherein the backup controller card is operative to perform at least one of the following operations as part of the translation:

translate data from fields of an active state data structure used by the old software to fields of the active state data structure used by the new software that have been rearranged relative to the fields of the active state data structure used by the old software; and assign a default value to a field of the active state data structure used by the new software that is not found in the active state data structure used by the old software; and a set of one or more line cards, the line cards to process and forward traffic.

22. The network element of claim 21, wherein the active state that is to be translated using the metadata comprises at least one of a traffic forwarding table, subscriber session data, and user session data.

23. The network element of claim 21, wherein the network element is configured to switch control over from the active controller card to the backup controller card so that the backup controller card becomes a new active controller card, wherein the new active controller card runs the new software.

24. The network element of claim 21, wherein the backup controller card is configured to translate the active state using an old set of metadata associated with the old software by comparing the metadata that describes the format used by the new software with the metadata associated with the old software.

25. The network element of claim 21, wherein the metadata describes names, types, and sizes of the fields of the active state data structure used by the new software in an extensible markup language (XML).

* * * * *